United States Patent Office 3,251,826
Patented May 17, 1966

3,251,826
CATIONIC OXIDIZED STARCH PRODUCTS
Charles L. Mehltretter, Peoria, Ill., assignor to the United States of America as represented by the Secretary of Agriculture
No Drawing. Filed Feb. 8, 1962, Ser. No. 172,034
3 Claims. (Cl. 260—233.3)

A nonexclusive, irrevocable, royalty-free license in the invention herein described, throughout the world for all purposes of the United States Government, with the power to grant sublicenses for such purposes, is hereby granted to the Government of the United States of America.

This application is a continuation-in-part of copending application, Serial No. 123,068, filed July 10, 1961, now abandoned.

This invention relates to novel cationic oxidized starch products obtained by the introduction of cationic hydrazide or cationic alkyl-substituted hydrazine substituents into oxidized starches to form the cationic hydrazones of oxidized starches, such oxidized starches having been prepared by oxidation of starch by periodate or other oxidizing agents to produce any desired proportion of reactive carbonyl groups therein. Another object of this invention is the preparation of novel cationic oxidized starch hydrazones for effective addition to cellulosic pulps to provide improved retention of pigments and to obtain improved dry and wet strengths in paper.

My novel cationic oxidized starch hydrazones may be dispersed in the reaction mixture at about 90° C. or in hot water after isolation in granule form to give semi-clear viscous pastes that do not thicken on standing. The pastes or dispersions obtained by both of these procedures are essentially the same in character and effect. The lowly oxidized, substituted members as hereinafter described may be employed in small quantities as retention agents, flocculating agents, sizing agents, and suspending agents. Other industrial uses of my products will become apparent from the subsequent description of their properties.

By the term "oxidized starch" I mean starch in which from 0.5 percent to at least 95 percent of the anhydroglucose units (AGU's) have been oxidized to contain reactive carbonyl groups while the polymer remains in high polymeric form and in the original granule state. Oxidized starches of low extent of oxidation have properties somewhat similar to starch. However, starches which have been highly oxidized especially by periodate so that essentially all of their anhydroglucose units have been converted to dialdehyde units are polymeric dialdehydes consisting of glyoxal and erythrose in hemiacetal linkage, and resemble starch only in the physical facts that they are polymeric and are in a granule state. The lowly oxidized starches and the highly oxidized starches are both essentially insoluble in cold water. The oxidizing agents are well known and may include periodic acid and its soluble salts, soluble dichromates, chlorine, hydrogen peroxide, and other agents capable of forming carbonyl groups in polysaccharides. The starches may be those obtained from corn, wheat, potato, tapioca, waxy maize, high amylose corn and the like.

Prior art cationic starches have been starch ethers prepared by reacting a tertiary or quaternary alkyl or hydroxyalkyl halide or epoxide with starch using an aqueous alkaline reaction medium. The cationic products of this invention are sharply distinguished therefrom in being hydrazones of oxidized starches, and it is an explicit object of this invention to prepare cationic oxidized starches in an acidic aqueous reaction medium by reaction of water-soluble hydrazines or hydrazides with essentially water-insoluble oxidized starches. My novel cationic oxidized starches, especially those of higher carbonyl content, cannot be prepared in an aqueous alkaline medium without extensive degradation and solubilization of the oxidized polysaccharide. The products of my invention when prepared at ambient temperature and thus in the granule state are insoluble in cold water and are readily isolated by filtration. Those prepared and simultaneously dispersed by heating in situ may be employed directly in various applications.

This invention comprises the preparation of hydrazones of oxidized starches whereby the substituent grouping contains at least one cationic nitrogenous moiety. I have now discovered that novel cationic nitrogenous starch products having widely different industrial uses may be prepared by reacting oxidized starches containing either a low or a high content of carbonyl groups with substituted hydrazines or hydrazides containing tertiary amino or quarternary amino residues. The hydrazines and hydrazides that are suitable as reactants for my invention may be represented by the formula

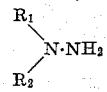

where only one of $R_1$ and $R_2$ may be hydrogen and each of $R_1$ and $R_2$ may also be further selected from the group consisting of alkyl, cationic alkyl, and cationic acyl radicals, $R_1$ and $R_2$ together containing not more than 10 carbon atoms. Examples of suitable hydrazine and hydrazide reagents are unsymmetrical dimethylhydrazine, β-triethylaminoethylhydrazine hydrochloride, betaine hydrazide hydrochloride, N,N-dimethylglycine hydrazide hydrochloride, etc. For effective dispersibility of the hydrazones in water the hydrazine or hydrazide reagents should contain a total of not more than 10 carbon atoms.

The reaction of the carbonyl groups in the oxidized starch molecule with the hydrazines or hydrazides may be represented by the following general equation

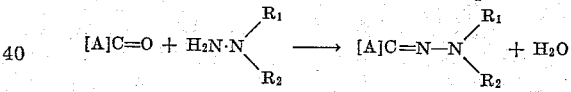

wherein $R_1$ and $R_2$ have the previously designated meanings and A represents the residue of the partially or substantially completely oxidized starch molecule. All of the carbonyl groups or only a portion of those groups present in the oxidized starch starting material may be reacted with the hydrazines or hydrazides by employing appropriate molar proportions.

It is a further specific object of my invention to prepare cationic oxidized starches in whole granule or in dispersed form from starch which has been oxidized to only a minor extent and thus contains carbonyl groups to the extent of only about 0.5 percent to above 10 percent oxidation of the AGU's in starch, wherein the carbonyl groups present are then reacted with an above defined hydrazine or hydrazide to form this specific embodiment of my novel cationic oxidized starch hydrazones. It is also an object of my invention to prepare cationic oxidized starches from starches which have been essentially completely oxidized, preferably by periodic acid or its soluble salts, and wherein only a minor proportion, up to about 20 percent but preferably 0.5 to 5 percent of the carbonyl groups present is then reacted with an above described hydrazine or hydrazide to form my novel cationic polymeric dialdehyde hydrazones. In these reactions such salts as sodium sulfate and sodium chloride may be added when necessary to reduce swelling of the granules in the aqueous reaction mixture. This preferred embodiment for the preparation of cationic polymeric dialdehyde hydrazones is of particular value because such cationic products may be prepared by reaction of polymeric dialdehydes such as the substantially fully oxidized dialdehyde starch of commerce with the aforesaid hydrazines or hydrazides.

Other advantages of my novel process of preparing cationic dialdehyde starches are that the reaction of dialdehyde starch with the cationic hydrazide or cationic hydrazine can be carired out essentially quantitatively in water under practical conditions of pH and temperature. In fact the cationic hydrazide hydrochloride may be added in various proportions to the oxidized starch suspended in water and the mixture heated at about 90° C. with agitation to simultaneously form the hydrazone and disperse it for direct application. At this higher temperature the reaction is essentially quantitative and the hydrazide is utilized more efficiently.

The introduction of cationic groups to oxidized starch through hydrazone formations adds a positive electrical charge to the oxidized starch molecules and increases their affinity for negatively charged or anionic materials such as pigments, paper pulp, and the like. The products of low degrees of oxidation after hydrazone formation are therefore of value as retention agents for pigments, dyes, and wet-strength anionic materials in aqueous systems. The oxidized starches of high extents of oxidation, preferably prepared by reaction of starch with periodic acid or its soluble salts, and then preferably only partially reacted with the cationic hydrazine or, also preferably, hydrazide reagent have direct and particular value as wet-end additives in the manufacture of paper for increasing the dry and wet strengths of finished paper.

The proportion of hydrazine or hydrazide to use will depend on the degree of substitution desired. With highly oxidized (commercial dialdehyde) starch, I generally prefer to substitute only about 0.5 percent to about 5 percent of the carbonyl groups with the cationic hydrazide moiety and not to employ a substituted hydrazine. In the case of the lowly oxidized starches (having low carbonyl content) I prefer to react a major proportion or all of the carbonyl groups with either a hydrazine or a hydrazide. Thus, in general for practical reasons I prefer to react only a large enough proportion of the carbonyl groups present to produce an effective cationic charge on the product molecule. Larger proportions of available carbonyl content (in the more highly oxidized starches) may be reacted with the preferred hydrazides, but the greater cost would ordinarily not be justified by a correspondingly improved result.

The following examples illustrate the invention.

Example 1

50 grams of oxidized starch (45.2 g. dry basis) prepared by periodic acid oxidation of corn starch to the extent of 1 percent of theory (1 dialdehyde unit per 100 anhydroglucose units (AGU's)) was slurried in 70 ml. of water. To the continuously stirred slurry was added 15 ml. of water containing 1 ml. (0.8 gram) of unsymmetrical dimethylhydrazine and a few drops of acetic acid. The whole mixture was allowed to react at room temperature for 24 hours. The pH of the final reaction product mixture was 4.5. The product was isolated by filtration, washed with water and dried at 65° C. overnight. Yield: 48.3 grams of white product. The nitrogen content was 0.13 percent (dry basis); moisture, 4.83 percent.

A dispersion of moderate viscosity was obtained when 3 grams of the product was cooked in 97 grams of water for 6 minutes at 95° C. (steam bath), which did not change appreciably on cooling and standing. A probable structure for the hydrazone portion of the reacted oxidized starch molecules is

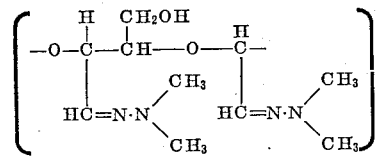

Example 2

50 grams of oxidized starch prepared by periodic acid oxidation of corn starch to the extent of 3 percent of theory was slurried in 70 ml. of water. To the stirred slurry was added 15 ml. of water containing 1.5 ml. of unsymmetrical dimethylhydrazine and enough acetic acid for acidification of the solution. The mixture was allowed to react at about 50° C. for 2 hours. The orange colored mixture was filtered and the residue thoroughly washed with water and dried to yield 43.8 g. of a light ivory colored product. Nitrogen content: 0.25% (dry basis); moisture, 5.9%. The product was readily pasted in hot water to form a viscous dispersion.

Example 3

The procedure of Example 2 was used to react 1 ml. of unsymmetrical dimethylhydrazine with 50 grams of starch oxidized by periodate to the extent of 0.5 percent of theory. The nearly white dried product weighted 47 grams. Nitrogen content: .07%; moisture, 7.37%.

The product was readily pasted in hot water to a fairly clear viscous dispersion which did not thicken appreciably on cooling and standing.

Example 4

50 grams of a commercial hypochlorite oxidized starch containing approximately 6 percent of theory of carbonyl groups was slurried in 70 ml. of water, and 15 ml. of water containing 4 grams of betaine hydrazide hydrochloride was added. The mixture was stirred at 35–40° C. for 5 hours. After filtration the white product was thoroughly washed with water and dried at 65° C. overnight. Yield: 47.3 grams. Nitrogen content: 0.27%; moisture, 6.4%. The product was readily dispersed in hot water to a nearly clear solution.

Example 5

100 grams of commercial dialdehyde starch (93 percent of theory dialdehyde content; moisture 11 percent) was slurried in 120 ml. of water at 38° C., and 50 ml. of water containing 10 grams of betaine hydrazide hydrochloride and a few drops of dilute hydrochloric acid was added over a 15 minute period. The mixture (pH 2.5) was stirred at 38° C. for ¾ hour more after which it was cooled and the product isolated by filtration, washed with water and acetone and dried at 45° C. The nearly white product weighed 100 grams. Nitrogen content: 1.86% (dry basis); moisture, 10%.

A 3 percent dispersion in water was obtained after several minutes of heating at 95° C. Because of the cationic nature of the product, it had good substantivity to cellulosic fibers by addition at the wet-end of paper manufacture. The dialdehyde structure of the product attached to the fibers by electrical charge allows improved wet and dry strength to be obtained in paper prepared from the treated cellulosic fibers or pulp.

Example 6

25 grams of dialdehyde starch (93% of theory dialdehyde content; moisture 11%) was mechanically stirred in 50 ml. of water containing 12 grams of dissolved sodium sulfate at 25° C. and 5 ml. of water containing 3.5 grams of betaine hydrazide hydrochloride and a few drops of dilute hydrochloric acid was added. The mixture was stirred at about 25° C. for 4 hours (pH 2.4) and then filtered, washed thoroughly with water and dried. The nearly white product weighed 27.5 grams.

The product was readily dispersed in hot water.

Example 7

50 grams of commercial dialdehyde starch (93 percent of theory dialdehyde content; moisture 11 percent) was stirred in 70 ml. of water at about 40° C. and 15 ml. of water containing 4.5 grams of N,N-dimethylglycine hydrazide hydrochloride and a few drops of acetic acid were added. The mixture was stirred at 40° to 45° C. for one hour (pH 2.7). The product was then filtered, washed with water and dried at 65° C. Yield: 51.0 grams. Nitrogen: 2.10% (dry basis); moisture, 9.40%.

The product was readily dispersed in water at 95° C. Because of the cationic nature of the product it had good substantivity to cellulosic fibers.

Example 8

10 grams of dialdehyde starch of Example 7 was stirred in 323 ml. of water and 10 ml. of aqueous solution containing 0.5 gram of betaine hydrazide hydrochloride and a few drops of dilute hydrochloric acid was added. The mixture was stirred at about 90° C. for 30 minutes to produce a semi-transparent, slightly viscous dispersion. Handsheets prepared from cellulose pulp which had been treated with a dilution of this dispersion showed increased dry and wet strengths.

Example 9

10 grams of dialdehyde starch of Example 7 was stirred in 323 ml. of water and 10 ml. of an aqueous solution containing 1.0 gram of N,N-dimethylglycine hydrazide hydrochloride and a few drops of dilute hydrochloric acid was added. The mixture was stirred at about 85° C. for 40 minutes to give a semi-transparent viscous dispersion. Handsheets of paper prepared from cellulosic pulp which had been treated with the above dispersion at 2.5 percent level of addition of the product showed high dry and wet strength.

I claim:

1. A cationic oxidized starch hydrazone, said oxidized starch hydrazone being in granule form and further being the product obtained by reacting at ambient temperature a water-insoluble oxidized starch containing carbonyl groups equivalent to between 0.5 and 6 percent oxidation of the anhydroglucose units in starch with a nitrogen-containing compound selected from the group consisting of unsymmetrical dimethylhydrazine, and betaine hydrazide hydrochloride in an acidic aqueous medium, said nitrogen-containing compound having been present in a sufficient amount to react with all of the said carbonyl groups.

2. The cationic oxidized starch hydrazone of claim 1 wherein the nitrogen containing compounds is unsymmetrical dimethylhydrazine.

3. The cationic oxidized starch hydrazone of claim 1 wherein the nitrogen-containing compound is betaine hydrazide hydrochloride.

References Cited by the Examiner

UNITED STATES PATENTS

| | | | |
|---|---|---|---|
| 3,021,329 | 2/1962 | Borchert | 260—233.3 XR |
| 3,099,573 | 7/1963 | Borchert | 260—233.3 |
| 3,169,076 | 2/1965 | Borchert | 260—233.3 XR |

OTHER REFERENCES

Pigman et al.: "Carbohydrate Chemistry," page 58, lines 1–13, 1948, Academic Press, Inc., N.Y.

LEON J. BERCOVITZ, *Primary Examiner.*

DONALD E. CZAJA, ABRAHAM H. WINKELSTEIN, *Examiners.*

R. W. MULCAHY, R. N. JONES, *Assistant Examiners.*